(12) United States Patent
Arunachalam et al.

(10) Patent No.: US 11,029,971 B2
(45) Date of Patent: Jun. 8, 2021

(54) AUTOMATED RESOURCE USAGE CONFIGURATIONS FOR DEEP LEARNING NEURAL NETWORK WORKLOADS ON MULTI-GENERATIONAL COMPUTING ARCHITECTURES

(71) Applicant: Intel Corporation, Santa Clara, CA (US)

(72) Inventors: Meenakshi Arunachalam, Portland, OR (US); Kushal Datta, Hillsboro, OR (US); Vikram Saletore, Hillsboro, OR (US); Vishal Verma, Chandler, AZ (US); Deepthi Karkada, Charlotte, NC (US); Vamsi Sripathi, Hillsboro, OR (US); Rahul Khanna, Portland, OR (US); Mohan Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 16/259,608

(22) Filed: Jan. 28, 2019

(65) Prior Publication Data
US 2019/0155620 A1 May 23, 2019

(51) Int. Cl.
*G06F 1/24* (2006.01)
*G06F 9/00* (2006.01)
*G06F 9/445* (2018.01)
*G06N 5/04* (2006.01)
(Continued)

(52) U.S. Cl.
CPC ......... *G06F 9/44505* (2013.01); *G06F 9/505* (2013.01); *G06N 3/04* (2013.01); *G06N 5/04* (2013.01)

(58) Field of Classification Search
CPC ....... G06F 9/44505; G06F 9/505; G06N 5/04; G06N 3/04; G06N 3/08; G06N 3/063
See application file for complete search history.

(56) References Cited

U.S. PATENT DOCUMENTS

| 8,126,696 B1 * | 2/2012 | Faraboschi | G06F 30/20 |
| | | | 703/21 |
| 2013/0227180 A1 * | 8/2013 | Bisht | G06F 3/0659 |
| | | | 710/39 |

(Continued)

OTHER PUBLICATIONS

Jayesh Bapu Ahire, "Perceptron and Backpropagation", Medium, Feb. 9, 2018, 11 pages.

(Continued)

*Primary Examiner* — Xuxing Chen
(74) *Attorney, Agent, or Firm* — Jordan IP Law, LLC

(57) ABSTRACT

Systems, apparatuses and methods may provide for technology that identifies a first set of compute nodes and a second set of compute nodes, wherein the first set of compute nodes execute more slowly than the second set of compute nodes. The technology may also automatically determine a compute node configuration that results in a relatively low difference in completion time between the first set of compute nodes and the second set of compute nodes with respect to a neural network workload. In an example, the technology applies the compute node configuration to an execution of the neural network workload on one or more nodes in the first set of compute nodes and one or more nodes in the second set of compute nodes.

17 Claims, 9 Drawing Sheets

(51) Int. Cl.
   *G06N 3/04*   (2006.01)
   *G06F 9/50*   (2006.01)

(56) References Cited

U.S. PATENT DOCUMENTS

2016/0188379 A1* 6/2016 Rajappa .................... G06F 9/52
                                                                  718/107
2017/0024849 A1* 1/2017 Liu .......................... G06T 1/20
2017/0068574 A1* 3/2017 Cherkasova .......... G06F 9/4881

OTHER PUBLICATIONS

Amazon Web Services, "Amazon EC2 Instance Types", <aws.amazon.com/ec2/instance-types/>, retrieved on Oct. 11, 2018, 17 pages.
J. Chen et al., "Revisiting Distributed Synchronous SGD", ICLR 2017, Dec. 14, 2016, 11 pages.
V. Codreanu et al., "Scale out for large minibatch SGD: Residual network training on ImageNet-1K with improved accuracy and reduced time to train", Nov. 15, 2017, 10 pages.
P. Goyal et al., "Accurate, Large Minibatch SGD: Training ImageNet in 1 Hour", Apr. 30, 2018, 12 pages.

* cited by examiner

30

Identify a first set of compute nodes and a second set of compute nodes, wherein the first set of compute nodes execute more slowly than the second set of compute nodes  32

Determine a compute node configuration that results in a relatively low difference in completion time between the first set of compute nodes and the second set of compute nodes with respect to a neural network workload  34

Apply the compute node configuration to an execution of the neural network workload on one or more nodes in the first set of compute nodes and one or more nodes in the second set of compute nodes  36

Enumerate possible configuration combinations for the first set of compute nodes and the second set of compute nodes  42

Measure a throughput and an a completion time associated with each of the possible configuration combinations  44

Select the compute node configuration from the possible configuration combinations based on the measured throughputs and execution times  46

FIG. 3

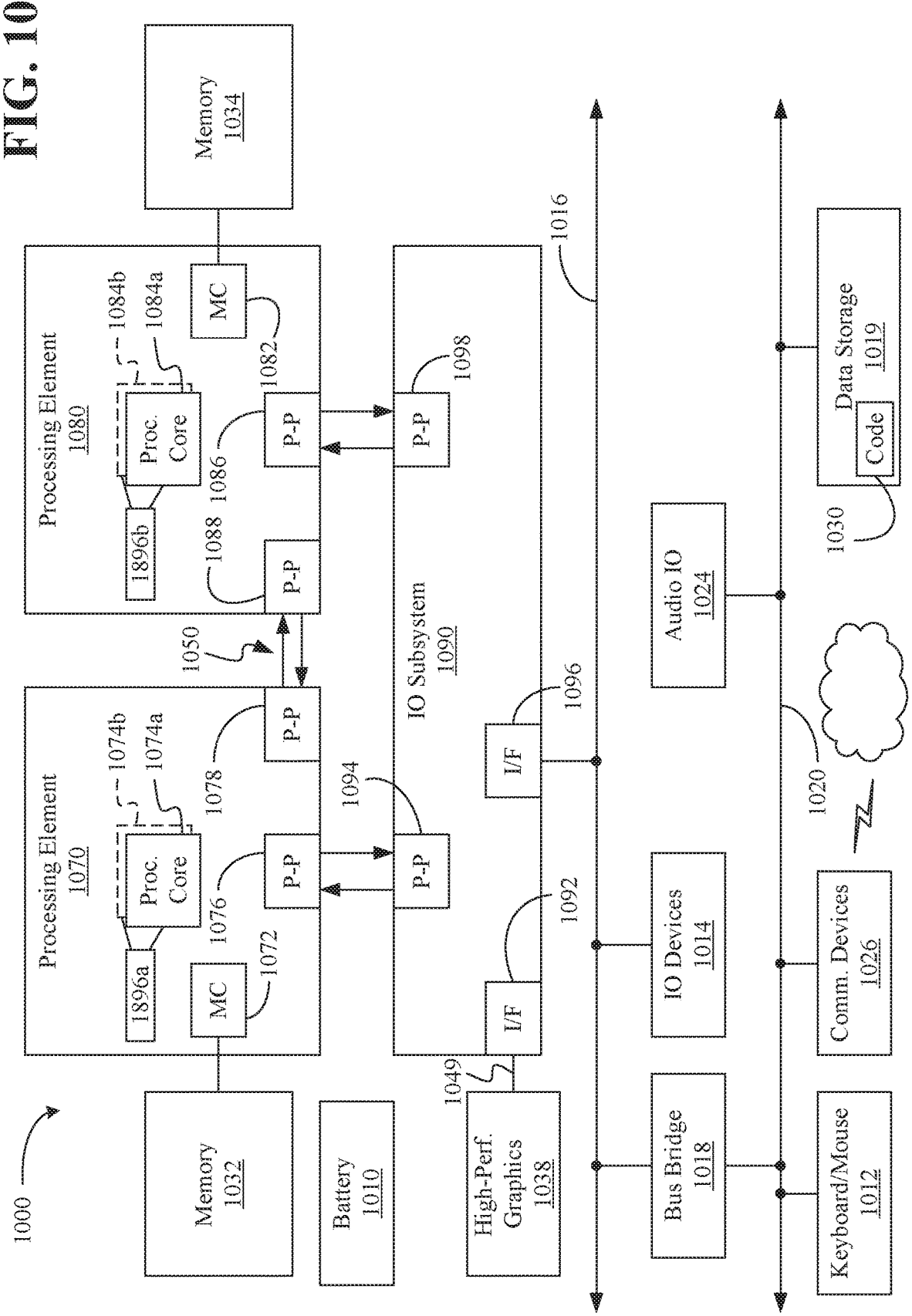

AUTOMATED RESOURCE USAGE CONFIGURATIONS FOR DEEP LEARNING NEURAL NETWORK WORKLOADS ON MULTI-GENERATIONAL COMPUTING ARCHITECTURES

TECHNICAL FIELD

Embodiments generally relate to machine learning technology. More particularly, embodiments relate to automated resource usage configurations for deep learning (DL) neural network workloads on multi-generational computing architectures.

BACKGROUND

Machine learning may involve the use of neural networks that are trained on known input data (e.g., batches of pre-classified images in a computer vision application, language translation application, speech recognition application, etc.). When the amount of input data is large, the training process may be replicated across multiple compute nodes, with each compute node working on different "mini-batches" of input data simultaneously. Intermediate computations (e.g., loss function gradients) may be synchronized and averaged across all nodes per mini-batch iteration. To prevent the synchronization from introducing latency into the training process, conventional solutions may train the neural network only on processors and/or platforms that are from the same generation of devices (e.g., and therefore exhibit similar execution speeds). Such an approach may result in suboptimal usage of resources in cloud computing infrastructures, which typically contain computing nodes from different processor and/or platform generations.

BRIEF DESCRIPTION OF THE DRAWINGS

The various advantages of the embodiments will become apparent to one skilled in the art by reading the following specification and appended claims, and by referencing the following drawings, in which:

FIG. 2 is a flowchart of an example of a method of automatically configuring a computing architecture to execute a neural network workload according to an embodiment;

FIG. 3 is a flowchart of an example of a method of automatically determining a compute node configuration according to an embodiment;

FIG. 10 is a block diagram of an example of a multi-processor based computing system according to an embodiment.

DESCRIPTION OF EMBODIMENTS

Figure 1A:
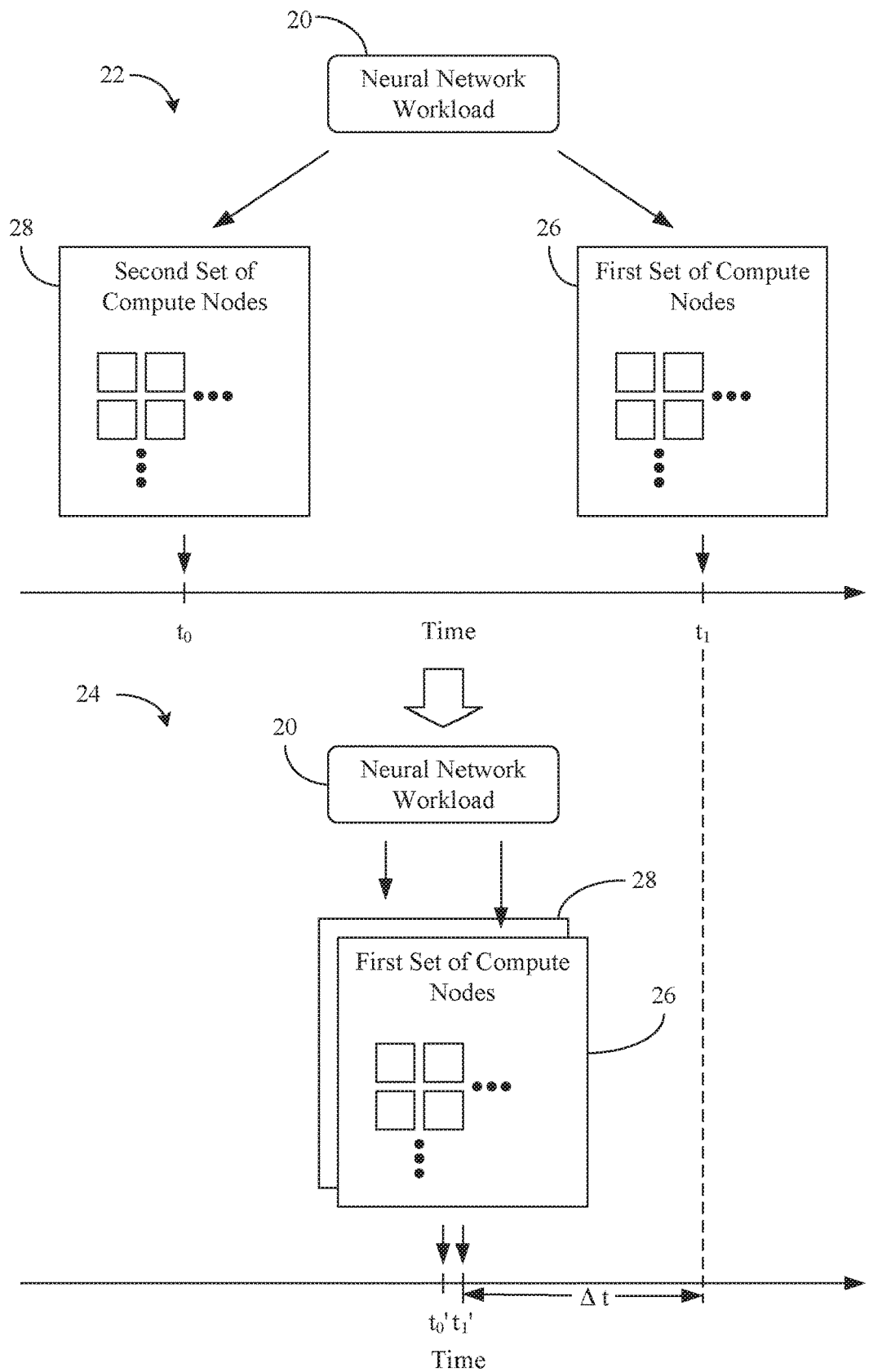
FIGS. 1A and 1B are comparative illustrations between compute node synchronizations according to embodiments.

Turning now to FIG. 1A, a neural network workload 20 is shown in a first machine learning architecture 22 and a second machine learning architecture 24. In an embodiment, the neural network workload 20 is a training workload that includes known input data (e.g., batches of pre-classified images in a computer vision application, batches of pre-classified phrases in a speech recognition application, and so forth) and associated neural network processes ("workers" or "instances" that conduct, e.g., forward propagation, backward propagation, discussed below) to converge on a set of weights that provide an acceptable level of accuracy when classifying the known input data. In another example, the neural network workload 20 is an inference workload that includes unknown input data (e.g., one or more batches of unclassified images in a compute vision application, one or more batches of unclassified phrases in a speech recognition application, and so forth) and associated neural network processes (e.g., workers or instances that conduct layered classifications on the unknown input data using weights resulting from training).

In the first machine learning architecture 22, the neural network workload 20 is executed by a compute cluster including a first set of compute nodes 26 (e.g., host processors, graphics processors, field-programmable gate arrays/FPGAs, application specific integrated circuits/ASICs) and a second set of compute nodes 28 (e.g., host processors, graphics processors, FPGAs, ASICs), wherein the first set of compute nodes 26 are considered "stragglers" to the extent that they generally execute more slowly than the second set of compute nodes 28 in the cluster. Although two sets of compute nodes 26, 28 are shown, the architectures 22, 24 may include more than two sets of compute nodes 26, 28. The difference in computing speed between the compute nodes 26, 28 might result from the first set of compute nodes 26 being from an earlier processor and/or platform generation (e.g., GenA) than the second set of compute nodes 28 (e.g., GenC). For example, the later generation may include a more efficient cache hierarchy, more memory and/or the ability to perform more floating operations per second (e.g., TFLOPS) than the earlier generation. Such a multi-generational computing architecture may occur in, for example, a cloud computing infrastructure where processors and platforms are replaced/refreshed by a cloud service provider (CSP) in stages.

Figure 4:
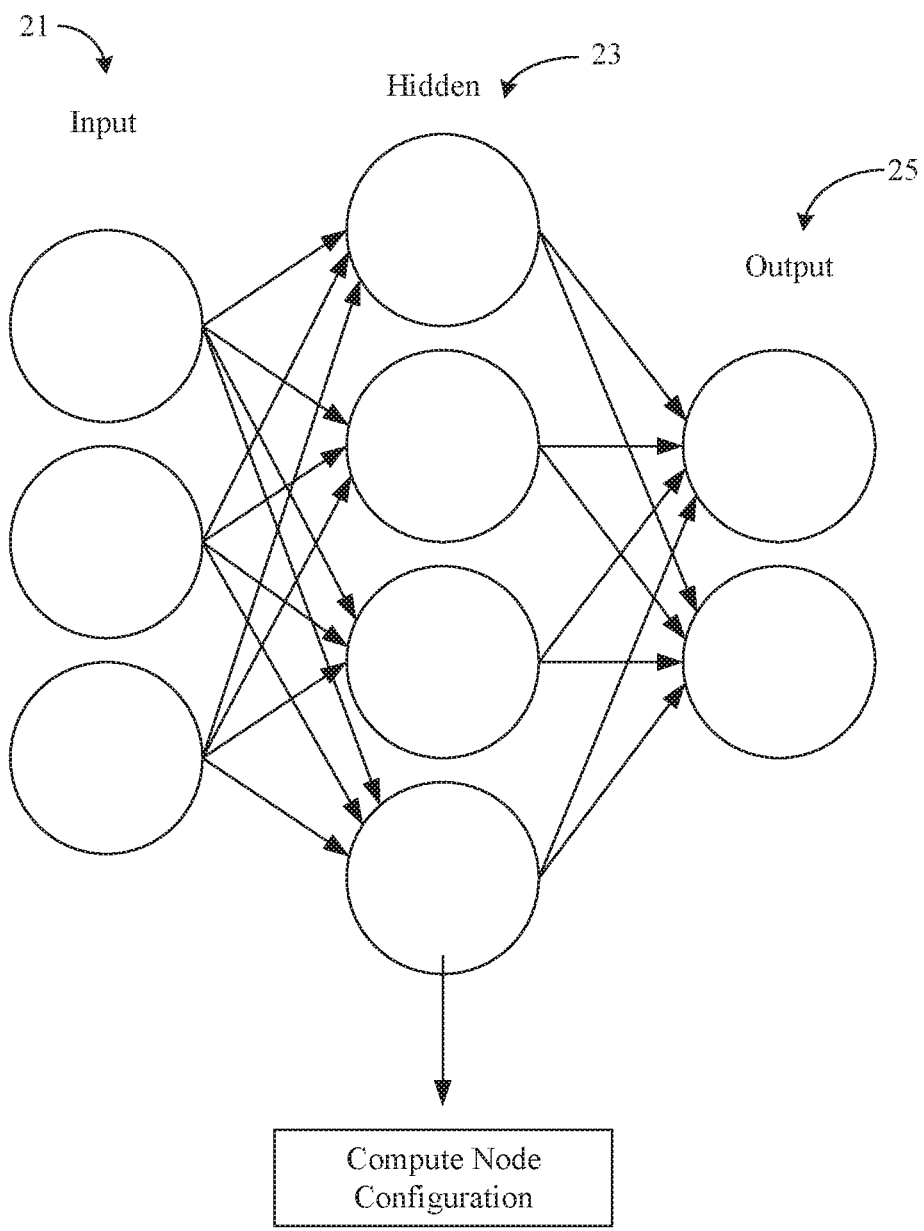
FIG. 4 is an illustration of an example of a neural network workload according to an embodiment.

With continuing reference to FIGS. 1A and 4, a training example of the neural network workload 20 is shown in a deep learning context, wherein stochastic gradient descent (SGD) technology is used. Deep learning may refer to machine learning technology that uses a cascade of multiple layers (e.g., one or more hidden layers 1). During training, an input signal (e.g., a batch of images) is fed to an input layer 21 of a neural network, which also includes one or more hidden layers 23 and an output layer 25, to quantify how accurately the network is able to classify the input signal via a differentiable loss or error function E. This process may be referred to as forward propagation. The illustrated network then computes the gradient $$\frac{\partial}{\partial w}(E)$$

of the loss function with respect to the current weights w. On the basis of the gradients, weights are updated according to equation (1) below, where w" are the updated weights, w' is the weight prior to the adjustment process and θ is a tunable parameter called the learning rate.

$$w'' = w' - \theta \frac{\partial}{\partial w}(E) \quad (1)$$

Since each layer of the neural network is a differentiable function of the layer that precedes it, the gradients are computed layer-by-layer, moving from output to input, in a process that may be referred to as backward propagation. In an embodiment, the computed gradients are synchronized and averaged across all compute nodes 26, 28 per mini-batch iteration.

In the illustrated example of the first machine learning architecture 22, the first set of compute nodes 26 (e.g., lower performing and slower "straggler" nodes) and the second set of compute nodes 28 are assigned the same amount of work (e.g., an equal local number of worker processes, an equal local batch size, etc.). Accordingly, the second set of compute nodes 28 completes execution of the assigned portion of the neural network workload 20 at a time $t_0$ and the first set of compute nodes 26 completes execution of the assigned portion of the neural network workload 20 at time $t_1$, which is substantially later than time $t_0$. During training, the first machine learning architecture 22 waits from time to until time $t_1$ to begin synchronization, which may involve averaging intermediate computations (e.g., loss function gradients) across all nodes 26, 28 per mini-batch iteration. Accordingly, synchronization may lead to poor performance (e.g., contradicting conventional wisdom that simply adding more compute nodes improves training time). Indeed, the reduced performance may occur even when using advanced gradient communication techniques such as, for example, MPI (message passing interface, e.g., MPI_Allreduce instruction) collectives. Thus, moving the gradients over fabric is typically not the issue.

Due to the latency impact on synchronization, conventional solutions may forego the deployment of the neural network workload 20 on the first set of compute nodes 26 altogether, and instead use only the second set of compute nodes 28. Such an approach results in suboptimal usage of resources and may reduce performance.

In the illustrated enhanced machine learning architecture 24, the first set of compute nodes 26 and the second set of compute nodes 28 are assigned different amounts of work (e.g., different local number of worker processes, different local batch sizes, etc.) based on a preliminary execution (e.g., test/profile run phase) of the neural network workload 20 on the compute nodes 26, 28. As will be discussed in greater detail, the preliminary execution of the neural network workload 20 enables a relatively low difference in completion time to be achieved between the first set of compute nodes 26 and the second set of compute nodes 28. In the illustrated example, the second set of compute nodes 28 is assigned more work and completes execution of the assigned portion of the neural network workload at a time $t_0'$, while the first set of compute nodes 26 is assigned less work and completes execution of the assigned portion of the neural network workload 20 at time $t_1'$, which is relatively close to time $t_0'$. During training, the second machine learning architecture 24 begins synchronization at time $t_1'$. Thus, when the neural network workload is a training workload (i.e., running deep learning for multiple batches for large number of Epochs), the relatively small difference in completion time reduces the synchronization time between the first set of compute nodes 26 and the second set of compute nodes 28 and Δt time savings is achieved for every global batch size of input data. The illustrated second machine learning architecture 24 therefore enhances performance and the user experience (e.g., faster computer vision results).

Figure 1B:
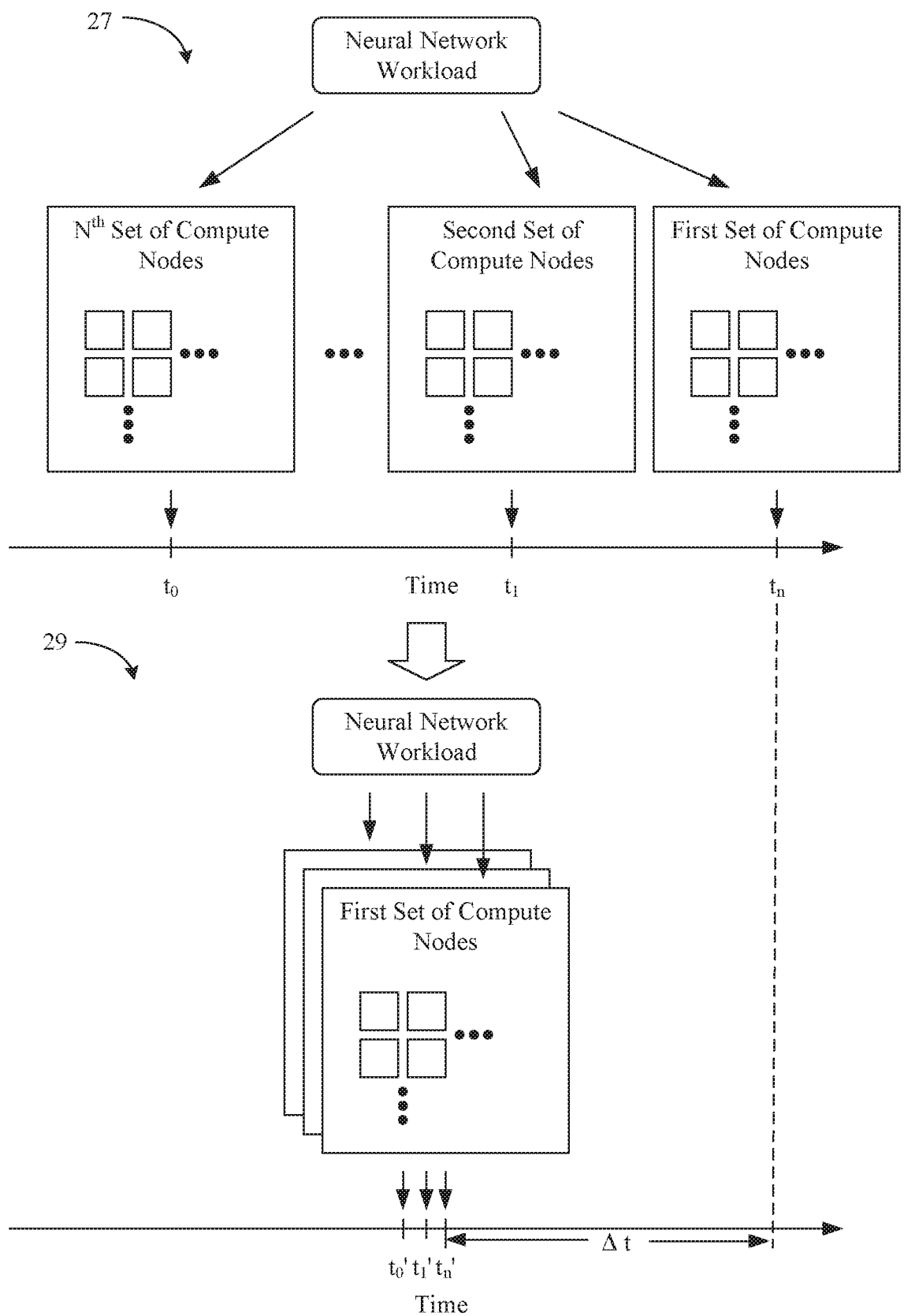

FIG. 1B demonstrates that similar advantages may be achieved by a second machine learning architecture 29 relative to a first machine learning architecture 27 when N sets of compute nodes are used.

FIG. 2 shows a method 30 of automatically configuring a computing architecture to execute a neural network workload. The method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 provides for identifying a first set of compute nodes and a second set of compute nodes, wherein the first set of compute nodes execute more slowly than the second set of compute nodes. Block 32 may include reading processor identifier (ID) information from one or more registers or other suitable location. In an embodiment, the first set of compute nodes includes an earlier generation of processors and/or platforms than the second set of compute nodes. Table I below shows an example of such a multi-generational computing architecture.

TABLE I

Multi-Generational Computing Architecture

| Configuration | 1st Set of Compute Nodes (Gen A) | 2nd Set of Compute Nodes (Gen C) |
|---|---|---|
| Platform | Platform i | Platform i + 1 |
| CPU | Processor j | Processor j + 2 |
| Memory | Memory x | Memory x + 1 |

Thus, Platform i+1 might be a later platform than Platform i, Processor j+2 may be a more powerful (e.g., more TFLOPS) CPU than Processor j, and Memory x+1 (e.g., two dual inline memory modules/DIMMs per channel, 16×16 GB 2133 MT/s DIMMs) might be larger than Memory x (e.g., one DIMM per channel, 12×16 GB 2667 MT/s DIMMs).

Block 34 determines a compute node configuration that results in a relatively small difference in completion time between the first set of compute nodes and the second set of compute nodes with respect to a neural network workload. In one example, the compute node configuration specifies the local number of processes on the first set of compute nodes, the local batch size for the first set of compute nodes, the local number of processes on the second set of compute nodes, the local batch size for the second set of compute nodes, and so forth. Block 34 may therefore find an optimal set of (e.g., matching) parameters tuned to run deep learning (DL) training or inference processes on a computing architecture having compute nodes with different compute capacities.

The compute node configuration is applied at block 36 to an execution of the neural network workload on one or more nodes in the first set of compute nodes and one or more nodes in the second set of compute nodes. When the neural network workload is a training workload, the relatively low difference in completion time reduces the synchronization time between the first set of compute nodes and the second set of compute nodes. When the neural network workload is an inference workload, the relatively low difference in completion time enables greater input/output (IO) efficiency to be achieved. Automatically configuring the computing architecture to achieve a relatively small difference in completion times as shown enables the illustrated method 30 to provide enhanced performance and more efficient resource usage with respect to neural network workloads.

FIG. 3 shows a method 40 of automatically determining a compute node configuration. The method 40 may generally be incorporated into block 34 (FIG. 2), already discussed. More particularly, the method 40 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 42 enumerates possible configuration combinations for the first set of compute nodes and the second set of compute nodes. In an embodiment, block 42 determines all possible combinations of processor/platform generation, local number of processes/workers and local batch size (e.g., amount of input data handled by each process/worker). The local batch sizes may be received as user input and/or determined via a sweep, which may increase the complexity of the search. Block 44 measures (e.g., profiles) the throughput and maximum completion time associated with each of the possible configuration combinations (e.g., via a preliminary execution and/or test run phase of, for example, a few training iterations for a relatively short duration). In an embodiment, the measured throughputs are output in a data structure such as, for example, Table II.

TABLE II

| Throughput Performance | | | | |
|---|---|---|---|---|
| Images/sec | Local#Wkers | Local#Wkers | Local#Wkers | Local#Wkers |
| Gen A LocalBatchSize/ Worker | 2 | 4 | 6 | 8 |
| 32 | 39.1 | 44.9 | 47.4 | 47.5 |
| 64 | 40.3 | 44.5 | 48.2 | 47.8 |
| 96 | 46.0 | 46.0 | 48.6 | 48.4 |
| Gen C LocalBatchSize/ Worker | 2 | 4 | 6 | 8 |
| 32 | 59.0 | 80.2 | 92 | 104 |
| 64 | 84.8 | 96 | 108 | 115 |
| 96 | 81.1 | 101.1 | 114.7 | 119 |

Figure 5A:
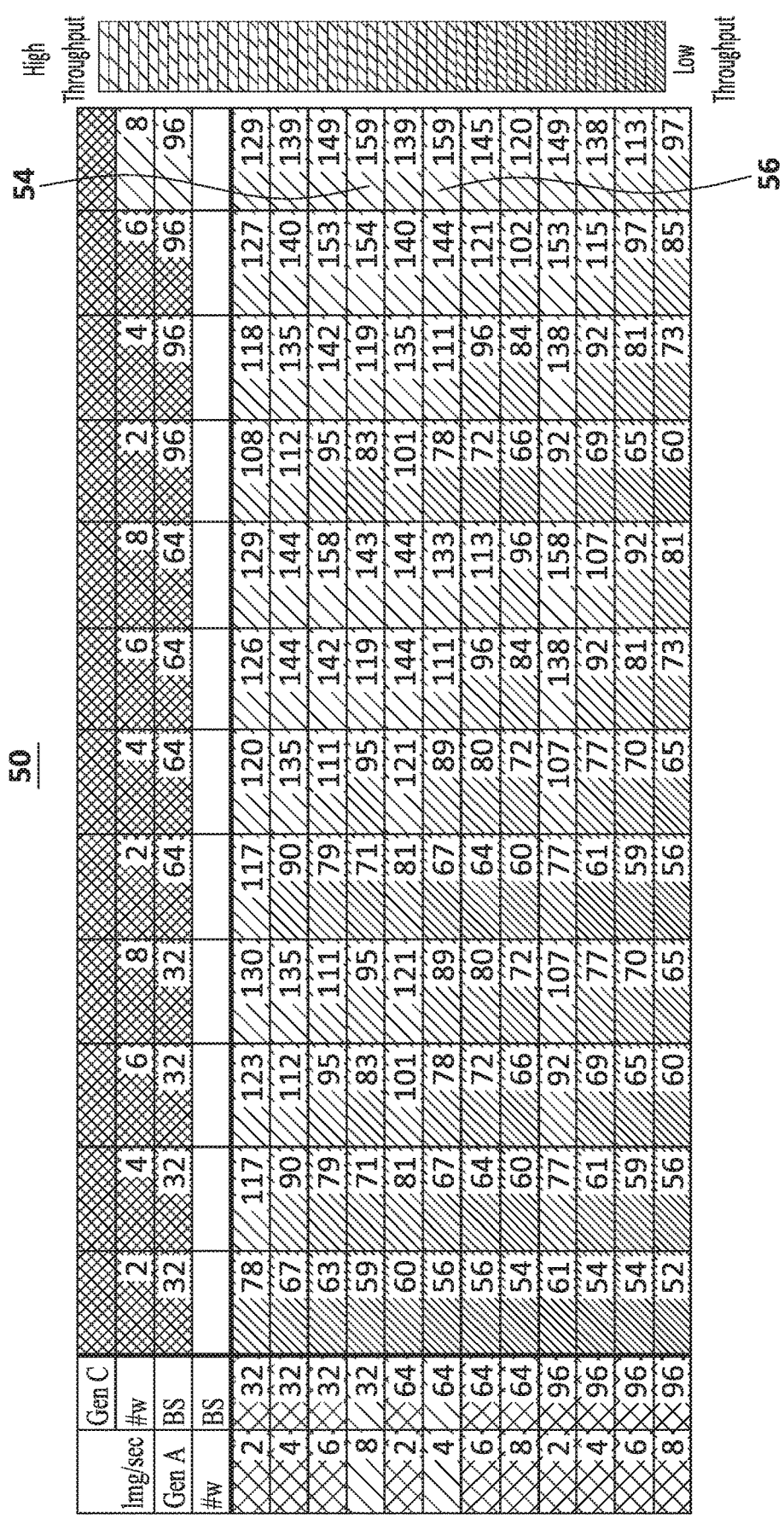
FIG. 5A is an illustration of an example of a throughput heat map table according to an embodiment.

Moreover, the measured completion times may be output in a data structure such as, for example, Table III. For example, 1.64 Secs/batch for Gen A is given by (2 Workers*32 LocalBatchSize/Worker)/(39.1 Images/sec) using data from Table II. Similarly, 1.08 Secs/batch for Gen C is given by (2 Workers*32 LocalBatchSize/Worker)/(59 Images/sec). As will be discussed in greater detail, the corresponding heat map element in FIG. 5A is given by global batch size across Gen A and Gen C by the maximum completion time, i.e., ((2*32)+(2*32))/MAX(1.64, 1.08) resulting in 78 images/sec as shown in FIG. 5A.

TABLE III

| Completion Times | | | | |
|---|---|---|---|---|
| Secs/batch | Local#Wkers | Local#Wkers | Local#Wkers | Local#Wkers |
| Gen A LocalBatchSize/ Worker | 2 | 4 | 6 | 8 |
| 32 | 1.64 | 2.85 | 4.05 | 5.39 |
| 64 | 3.17 | 5.76 | 7.96 | 10.70 |
| 96 | 4.18 | 8.36 | 11.85 | 15.87 |
| Gen C LocalBatchSize/ Worker | 2 | 4 | 6 | 8 |
| 32 | 1.08 | 1.60 | 2.09 | 2.46 |
| 64 | 1.51 | 2.67 | 3.56 | 4.45 |
| 96 | 2.37 | 3.80 | 5.02 | 6.45 |

Measuring the completion time variable in seconds/batch may ensure that when the neural network workload is run across the two very different architectures, for synchronous SGD, the combined throughput performance in images/sec is given by the maximum time to complete the local batch on any given architecture (e.g., because the slowest compute node will drive the synchronization for SGD at each iteration or step for deep learning training). Therefore, the difference in batch completion times (or service time) for different architectures may be minimized. Illustrated block 46 selects the compute node configuration from the possible configuration combinations based on the measured throughputs and completion times. As already noted, the selected compute node configuration results in a relatively low difference in completion time between the first set of compute nodes and the second set of compute nodes. In an embodiment, the selected compute node configuration is also associated with a relatively high throughput.

Figure 5B:
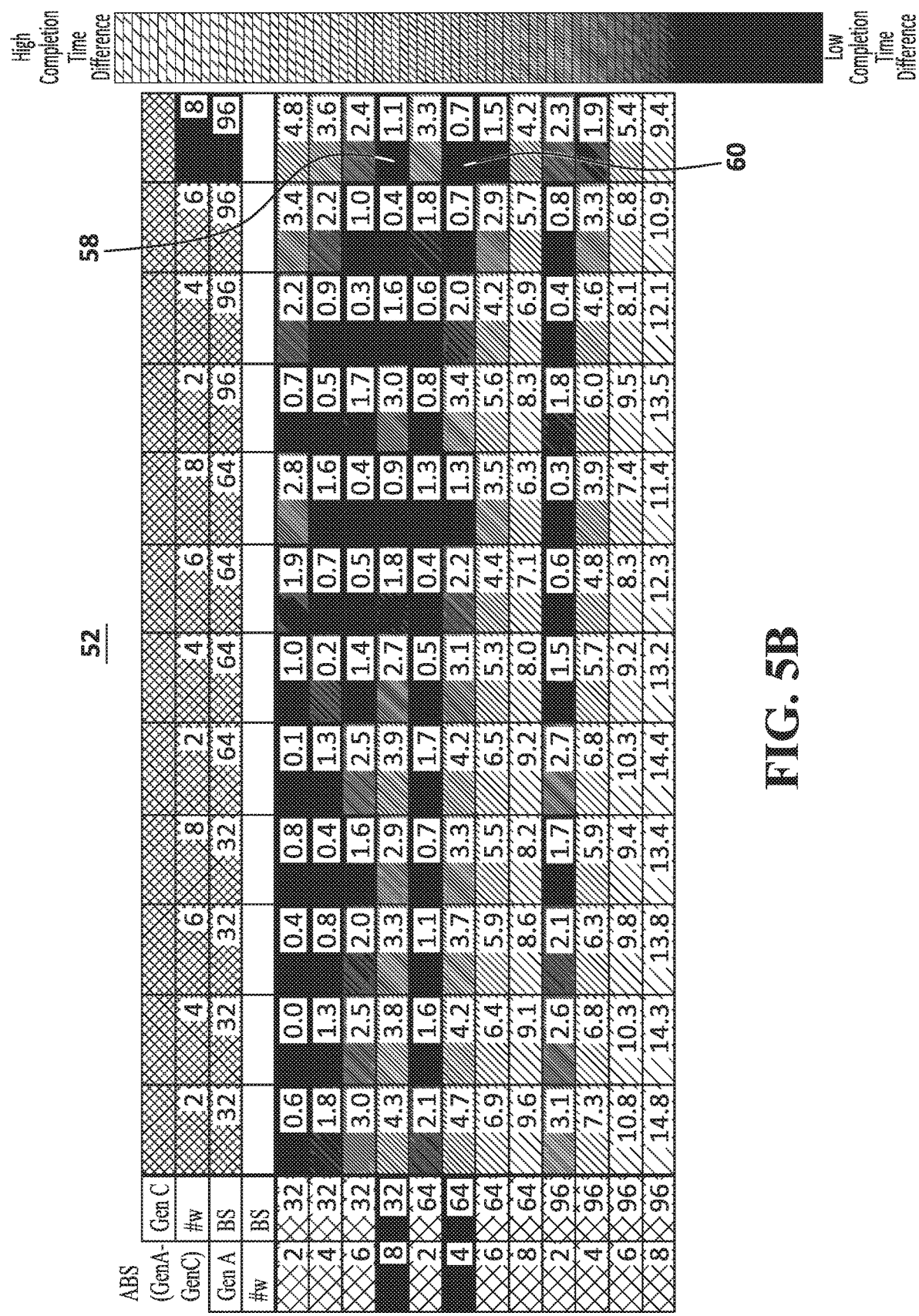
FIG. 5B is an illustration of an example of a completion time difference heat map table according to an embodiment.

Turning now to FIGS. 5A and 5B, the measured throughputs and completion times (e.g., completion time per mini-batch) may be used to generate a throughput performance heat map table 50 and a completion time heat map table 52, respectively. In the illustrated example, cells 54 and 56 in the throughput heat map table 50 represent the highest throughput (i.e., 159 images/sec). Thus, the cell 54 configuration corresponds to 8 local worker processes on the Gen C set of compute nodes and a local batch size of 96 on the Gen C set of compute nodes combined with 8 local worker processes on the Gen A set of compute nodes and a local batch size of 32 on the Gen A set of compute nodes. The cell 56 configuration corresponds to 8 local processes on the Gen C set of compute nodes and a local batch size of 96 on the Gen C set of compute nodes combined with 4 local processes on the Gen A set of compute nodes and a local batch size of 32 on the Gen A set of compute nodes.

In the illustrated example, cell 58 (i.e., 1.1 absolute/ABS difference in completion time) in the completion time heat map table 52 corresponds to cell 54 in the throughput heat map table 50 and cell 60 (i.e., 0.7 ABS difference in completion time) in the completion time heat map table 52 corresponds to cell 56 in the throughput heat map table 50. Thus, automatically selecting the compute node configuration corresponding to cell 60 (i.e., 8 local processes on the Gen C set of compute nodes and a local batch size of 96 on the Gen C set of compute nodes combined with 4 local processes on the Gen A set of compute nodes and a local batch size of 64 on the Gen A set of compute nodes) results in a relatively high throughput (i.e., 159 images/sec) and a relatively low difference in completion time (i.e., 0.7 ABS difference in completion time).

The pseudo code below provides an example of an automated approach to the technology described herein. The first loop (LOOP0) measures the throughput (e.g., operations/second) for each combination of CPU type, local batch size and number of workers. Hence a 3-dimensional matrix "M3D_throughput" is used. The second loop (LOOP1) calculates the seconds/batch or iteration time (e.g., completion/execution time) for each combination. To account for synchronization time, the largest iteration time is calculated and then divided by the total operations completed to find the effective throughput. Within the same loop, a 6-dimensional matrix analogous to the heat map tables 50 and 52 (FIGS. 5A and 5B, respectively) is constructed. The throughput matrix is sorted in descending order to find the combinations providing highest values and the matrix containing differences in iteration time is sorted in ascending time to find the combination with the smallest value. The combination with the smallest difference in iteration time may be selected as the compute node configuration.

```
int N_CPUTYPES ← Number of CPU types in the data center
int L_BATCHSIZES[ ] ← List of local batch sizes (per worker) as
defined by the user [e.g. 32, 64, 96]
int L_WORKERS[ ] ← List of number of workers [e.g. 2, 4, 6, 8]
int n_batchsizes = length(L_BATCHSIZES)
int n_workers = length(L_WORKERS)
// 3D matrix of individual CPU throughput
float M3D_indpdt_throughput[N_CPUTYPES][n_batchsizes][n_workers]
// 3D matrix of individual iteration times
float M3D_indpdt_iteration_times[N_CPUTYPES][n_batchsizes][n_workers]
// 6D matrix of throughput with synchronization times
float    M6D_throughput_withsync[N_CPUTYPES][N_CPUTYPES]
[n_batchsizes] [n_workers][n_batchsizes][n_workers]
// 6D matrix of difference in iteration times
```

```
float    M6D_iteration_times[N_CPUTYPES][N_CPUTYPES][n_
batchsizes][n_workers][n_batchsizes][n_workers]
  LOOP0: To create data corresponding to Tables II and III
  for g ← 0 to (N_CPUTYPES - 1)
    for b ← 0 to (n_batchsizes - 1)
      for w ← 0 to (n_workers - 1)
        ops ← profile_training( )
        M3D_indpdt_throughput[g][b][w] ← ops
        M3D_indpdt_iteration_times[g][b][w]        ←
(L_BATCHSIZES[b])/ops
        // Due to diminishing returns, increasing the number of workers
        // doesn't always improve throughput (e.g., in the case of Gen A
        // batch size 64 throughput decreases from 48.2 to 47.8 for
        // workers 6 and 8 respectively [Table II]. Hence, break if a
        // knee of curve is reached or improvement is less than 5%
        if reached_knee(b,w) or difference_in_throughput(b,w) <0.05
        then
          break to outermost loop
      endfor
    endfor
  endfor
  LOOP1: To create data corresponding to tables 50 (FIG. 5A) and 52
(FIG. 5B)
  for g ← to (N_CPUTYPES - 1)
    for b ← 0 to (n_batchsizes - 1)
      for w ← 0 to (n_workers - 1)
        for m ← 0 to (n_batchsizes - 1)
          for n ← 0 to (n_workers - 1)
            max_iteration_time = 0
            global_batch_size = 0
            for k ← 0 to (N_CPUTYPES - 1)
              if          (max_iteration_time        <
M3D_indpdt_iteration_times[k][m][n]) then
                max_iteration_time           =
M3D_indpdt_iteration_times[k][m][n]
              endif
              global_batch_size  +=  L_BATCHSIZES[m]  *
L_WORKERS[n]
              // This produces throughput for all
              // possible combinations of CPU type,
              // batch size and # of workers
              M6D_throughput_withsync  [g][k][b][w][m][n]  =
global_batch_size/max_iteration_time
              for k ← 0 to (N_CPUTYPES - 1)
                M6D_iteration_times [g][k][b][w][m][n] =
                M3D_indpdt_iteration_times    [g][b][w]    -
M3D_indpdt_iteration_times[k][m][n]
  SORT0: Sort M6D_throughput_withsync in descending order
  SORT1: Sort M6D_iteration_times in ascending order
  FINAL: Pick the top element from SORT0 list and traverse SORT1
based on SORT0.batchsize==SORT1.batchsize  and  SORT0.number_
of_workers= SORT1.number_of_workers to find the minimum difference
in iteration time
```

For inference workloads, the batch size might be either BS=1 or BS>1, where the optimization may be slightly different between the two cases. So, depending on the circumstances (e.g., customer needs) both cases may be profiled to determine latency (e.g., latency=total exec time/batch size). For example, BS=1 may stress the best (e.g., lowest possible) latency that the system can produce and not much on the throughput; and BS>1 may also have a minimum latency requirement but gives more scope and opportunities for the system to optimize for throughput through better utilization and pipelining of the multiple inference streams.

Figure 6:
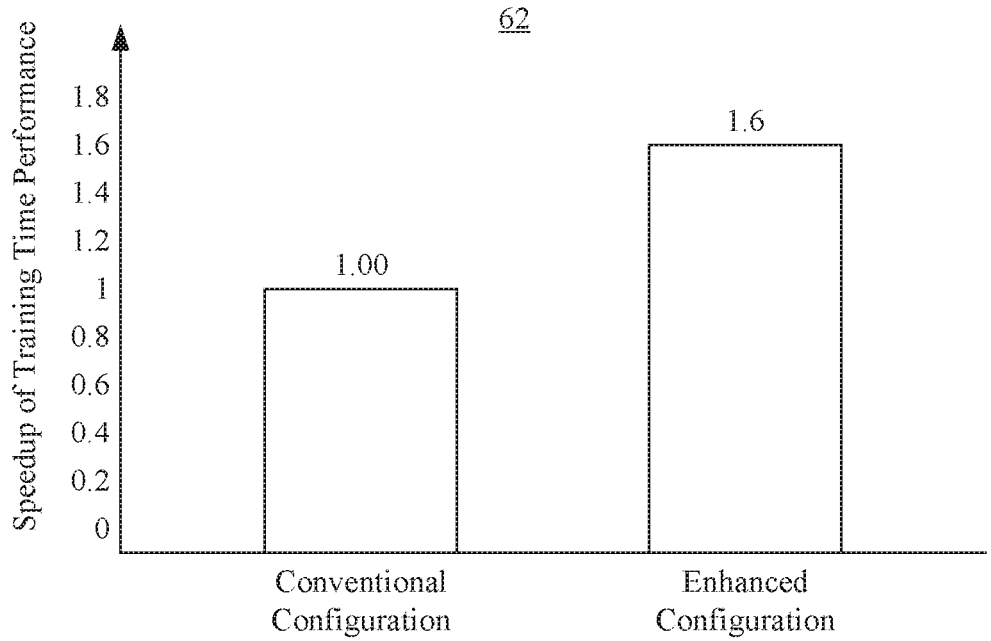
FIG. 6 is a comparative bar chart of an example of training time performance of a conventional compute node configuration and a compute node configuration according to an embodiment.

FIG. 6 shows a chart 62 demonstrating that unexpectedly positive results were achieved via the techniques described herein. In the illustrated example, higher numbers are better and an enhanced configuration with automated resource usage configurations yielded 60% faster training time relative to a conventional solution.

Figure 7:
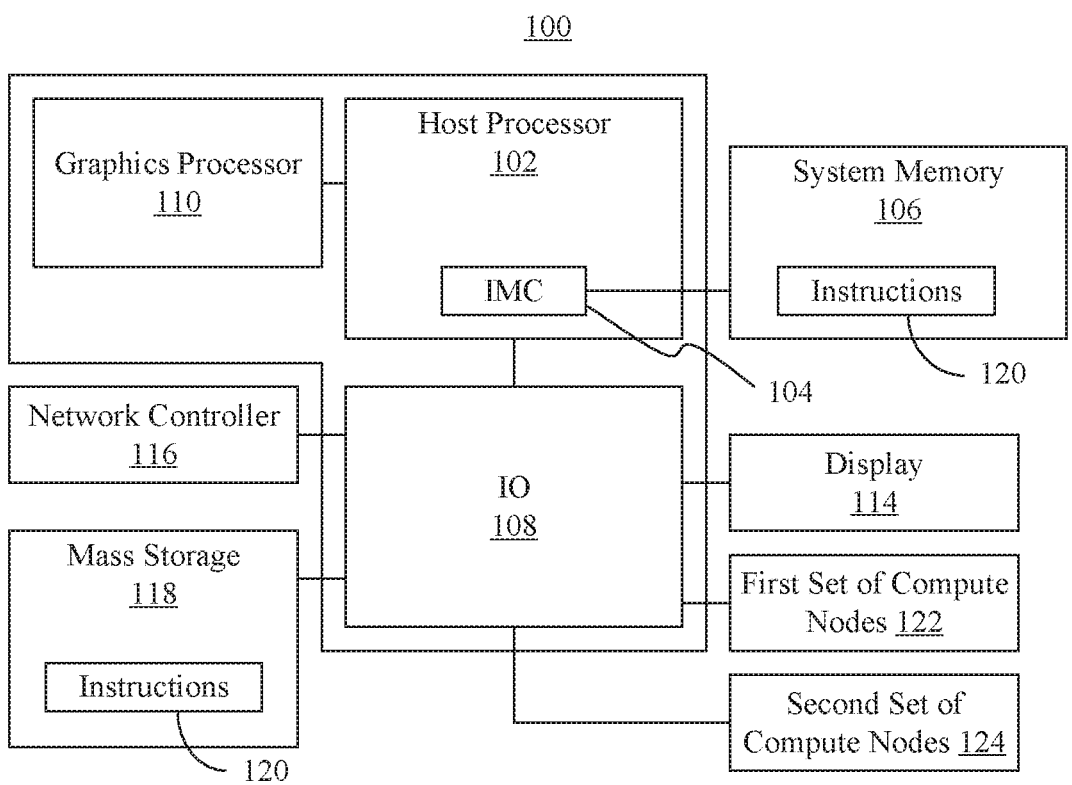
FIG. 7 is a block diagram of an example of a performance-enhanced computing system according to an embodiment.

Turning now to FIG. 7, a performance-enhanced computing system 100 is shown. The computing system 100 may generally be part of an electronic device/platform having computing functionality (e.g., personal digital assistant/ PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), gaming functionality (e.g., networked multi-player console), etc., or any combination thereof. In the illustrated example, the system 100 includes a processor 102 (e.g., host processor, CPU) having an integrated memory controller (IMC) 104 that is coupled to a system memory 106.

The illustrated system 100 also includes an input output (IO) module 108 implemented together with the multi-core processor 102 and a graphics processor 110 on a semiconductor die 112 as a system on chip (SoC). The illustrated IO module 108 communicates with, for example, a display 114 (e.g., touch screen, liquid crystal display/LCD, light emitting diode/LED display), a network controller 116 (e.g., wired and/or wireless), and mass storage 118 (e.g., hard disk drive/HDD, optical disk, solid state drive/SSD, flash memory). In an embodiment, the processor 102, IO module 108 and/or graphics processor 110 execute instructions 120 retrieved from the system memory 106 and/or mass storage 118 to perform one or more aspects of the method 30 (FIG. 2) and/or the method 40 (FIG. 3), already discussed.

Thus, execution of the instructions 120 may cause the computing system 100 to identify a first set of compute nodes 122 and a second set of compute nodes 124, wherein the first set of compute nodes 122 execute more slowly than the second set of compute nodes 124. Execution of the instructions 120 may also cause the computing system 100 to determine a compute node configuration that results in a relatively low difference in completion time between the first set of compute nodes 122 and the second set of compute nodes 124 with respect to a neural network workload. In an embodiment, execution of the instructions 120 also causes the computing system 100 to apply the compute node configuration to an execution of the neural network workload on one or more nodes in the first set of compute nodes 122 and one or more nodes in the second set of compute nodes 124. The illustrated computing system 100 therefore achieves higher overall performance, better data center resource usage and additional revenue per total cost of ownership (TCO) invested. For example, the slower first set of compute nodes 122 may add training time performance improvement over running solely on the faster second compute nodes 124.

Figure 8:
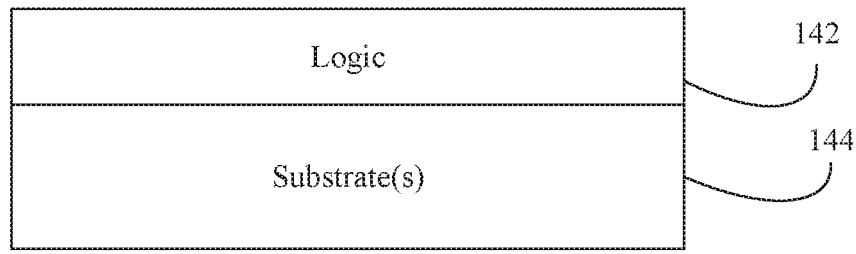
FIG. 8 is an illustration of an example of a semiconductor apparatus according to an embodiment.

FIG. 8 shows a semiconductor package apparatus 140. The illustrated apparatus 140 includes one or more substrates 144 (e.g., silicon, sapphire, gallium arsenide) and logic 142 (e.g., transistor array and other integrated circuit/ IC components) coupled to the substrate(s) 144. The logic 142 may be implemented at least partly in configurable logic or fixed-functionality logic hardware. In one example, the logic 142 implements one or more aspects of the method 30 (FIG. 2) and/or the method 40 (FIG. 3), already discussed. Thus, the logic 142 may identify a first set of compute nodes and a second set of compute nodes, wherein the first set of compute nodes execute more slowly than the second set of compute nodes and determine a compute node configuration that results in a relatively low difference in completion time between the first set of compute nodes and the second set of compute nodes with respect to a neural network workload. In an embodiment, the logic 142 also applies the compute node configuration to an execution of the neural network workload on one or more nodes in the first set of compute nodes and one or more nodes in the second set of compute nodes. The illustrated semiconductor package apparatus 140 therefore achieves higher overall performance, better data center resource usage and additional revenue per TCO invested.

In one example, the logic 142 includes transistor channel regions that are positioned (e.g., embedded) within the substrate(s) 144. Thus, the interface between the logic 142 and the substrate(s) 104 may not be an abrupt junction. The logic 142 may also be considered to include an epitaxial layer that is grown on an initial wafer of the substrate(s) 144.

Figure 9:
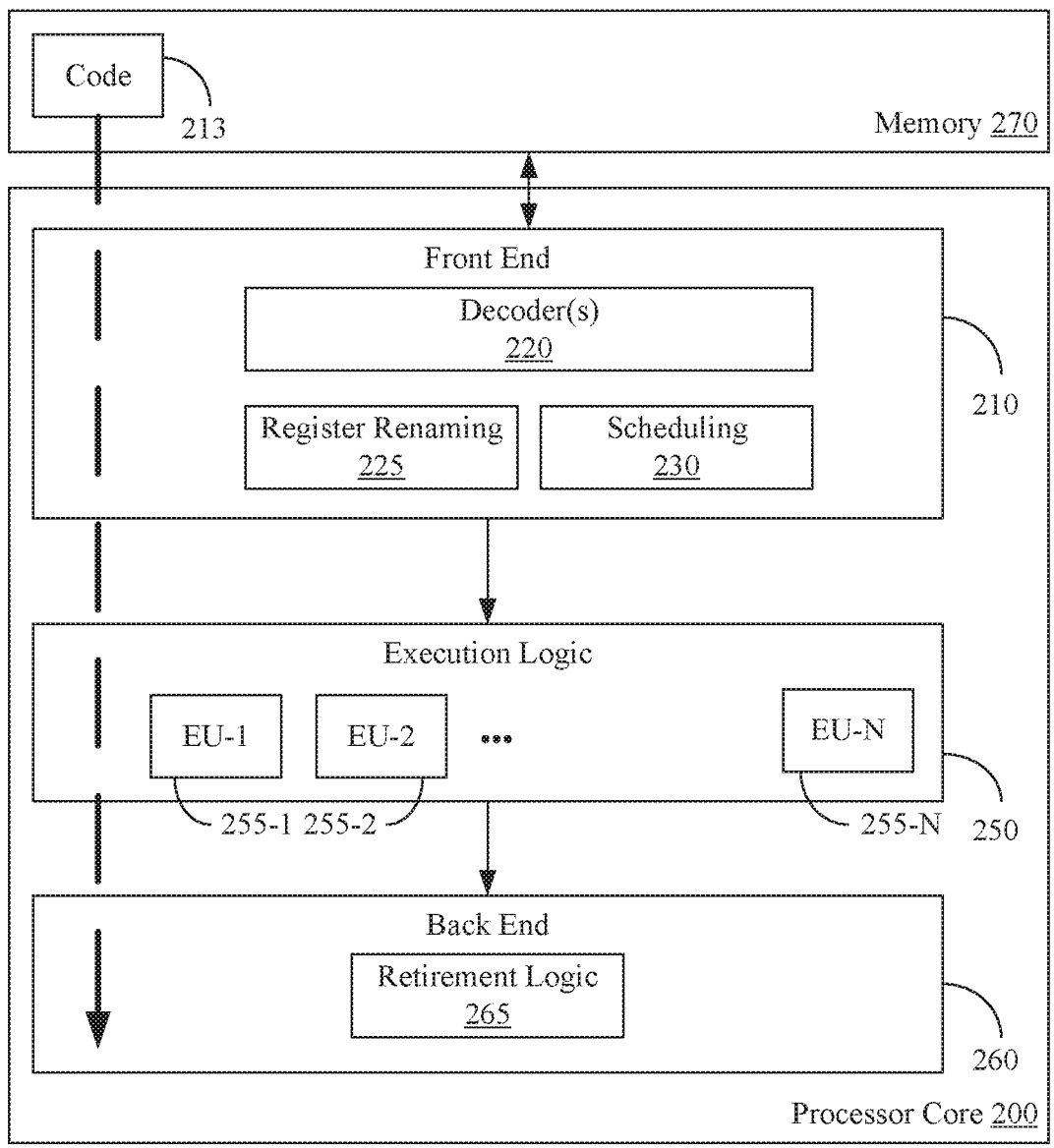
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIG. 2) and/or the method 40 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core

200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 30 (FIG. 2) and/or the method 40 (FIG. 3), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced computing system comprising a network controller, a processor coupled to the network controller, and a memory coupled to the processor, the memory including a set of executable program instructions, which when executed by the processor, cause the computing system to identify a first set of compute nodes and a second set of compute nodes, wherein the first set of compute nodes execute more slowly than the second set of compute nodes, determine a compute node configuration that results in a relatively low difference in completion time between the first set of compute nodes and the second set of compute nodes with respect to a neural network workload, and apply the compute node configuration to an execution of the neural network workload on one or more nodes in the first set of compute nodes and one or more nodes in the second set of compute nodes.

Example 2 includes the system of Example 1, wherein the executable instructions, when executed, cause the computing system to enumerate possible configuration combinations for the first set of compute nodes and the second set of compute nodes, measure a throughput and a completion time associated with each of the possible configuration combinations, and select the compute node configuration from the possible configuration combinations based on the measured throughputs and completion times.

Example 3 includes the system of Example 2, wherein the compute node configuration is to be associated with a relatively high throughput.

Example 4 includes the system of Example 1, wherein the compute node configuration is to specify a local number of processes on the first set of compute nodes, a local batch size for the first set of compute nodes, a local number of processes on the second set of compute nodes, and a local batch size for the second set of compute nodes.

Example 5 includes the system of Example 1, wherein the neural network workload is to be a training workload, and the relatively low difference in completion time reduces a synchronization time between the first set of compute nodes and the second set of compute nodes.

Example 6 includes the system of Example 1, wherein the neural network workload is to be an inference workload.

Example 7 includes a semiconductor package comprising one or more substrates, and logic coupled to the one or more substrates, wherein the logic is implemented at least partly in one or more of configurable logic or fixed-functionality hardware logic, the logic coupled to the one or more substrates to identify a first set of compute nodes and a second set of compute nodes, wherein the first set of compute nodes execute more slowly than the second set of compute nodes, determine a compute node configuration that results in a relatively low difference in completion time between the first set of compute nodes and the second set of compute nodes with respect to a neural network workload, and apply the compute node configuration to an execution of the neural network workload on one or more nodes in the first set of compute nodes and one or more nodes in the second set of compute nodes.

Example 8 includes the semiconductor package of Example 7, wherein the logic coupled to the one or more substrates is to enumerate possible configuration combinations for the first set of compute nodes and the second set of compute nodes, measure a throughput and a completion time associated with each of the possible configuration combinations, and select the compute node configuration from the possible configuration combinations based on the measured throughputs and completion times.

Example 9 includes the semiconductor apparatus of Example 8, wherein the compute node configuration is to be associated with a relatively high throughput.

Example 10 includes the semiconductor apparatus of Example 7, wherein the compute node configuration is to specify a local number of processes on the first set of compute nodes, a local batch size for the first set of compute nodes, a local number of processes on the second set of compute nodes, and a local batch size for the second set of compute nodes.

Example 11 includes the semiconductor apparatus of Example 7, wherein the neural network workload is to be a training workload, and the relatively low difference in completion time reduces a synchronization time between the first set of compute nodes and the second set of compute nodes.

Example 12 includes the semiconductor apparatus of Example 7, wherein the neural network workload is to be an inference workload.

Example 13 includes the semiconductor apparatus of Example 7, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to identify a first set of compute nodes and a second set of compute nodes, wherein the first set of compute nodes execute more slowly than the second set of compute nodes, determine a compute node configuration that results in a relatively low difference in completion time between the first set of compute nodes and the second set of compute nodes with respect to a neural network workload, and apply the compute node configuration to an execution of the neural network workload on one or more nodes in the first set of compute nodes and one or more nodes in the second set of compute nodes.

Example 15 includes the at least one computer readable storage medium of Example 14, wherein the executable instructions, when executed, cause the computing system to enumerate possible configuration combinations for the first set of compute nodes and the second set of compute nodes, measure a throughput and a completion time associated with each of the possible configuration combinations, and select the compute node configuration from the possible configuration combinations based on the measured throughputs and completion times.

Example 16 includes the at least one computer readable storage medium of Example 15, wherein the compute node configuration is to be associated with a relatively high throughput.

Example 17 includes the at least one computer readable storage medium of Example 14, wherein the compute node configuration is to specify a local number of processes on the first set of compute nodes, a local batch size for the first set of compute nodes, a local number of processes on the second set of compute nodes, and a local batch size for the second set of compute nodes.

Example 18 includes the at least one computer readable storage medium of Example 14, wherein the neural network workload is to be a training workload, and the relatively low difference in completion time reduces a synchronization time between the first set of compute nodes and the second set of compute nodes.

Example 19 includes the at least one computer readable storage medium of Example 14, wherein the neural network workload is to be an inference workload.

Example 20 includes a method comprising identifying a first set of compute nodes and a second set of compute nodes, wherein the first set of compute nodes execute more slowly than the second set of compute nodes, determining a compute node configuration that results in a relatively low difference in completion time between the first set of compute nodes and the second set of compute nodes with respect to a neural network workload, and applying the compute node configuration to an execution of the neural network workload on one or more nodes in the first set of compute nodes and one or more nodes in the second set of compute nodes.

Example 21 includes the method of Example 20, wherein determining the compute configuration includes enumerating possible configuration combinations for the first set of compute nodes and the second set of compute nodes, measuring a throughput and a completion time associated with each of the possible configuration combinations, and selecting the compute node configuration from the possible configuration combinations based on the measured throughputs and completion times.

Example 22 includes the method of Example 21, wherein the compute node configuration is associated with a relatively high throughput.

Example 23 includes the method of Example 20, wherein the compute node configuration specifies a local number of processes on the first set of compute nodes, a local batch size for the first set of compute nodes, a local number of processes on the second set of compute nodes, and a local batch size for the second set of compute nodes.

Example 24 includes the method of Example 20, wherein the neural network workload is a training workload, and the relatively low difference in completion time reduces a synchronization time between the first set of compute nodes and the second set of compute nodes.

Example 25 includes the method of Example 20, wherein the neural network workload is an inference workload.

Thus, technology described herein may enable neural network training and/or inference with multiple types, stock keeping units (SKUs), platforms, and generations of computation nodes through work allocation across CSP and data center clusters thus far not considered due to scheduling and synchronization challenges. A profiler may find the optimal number of workers and local batch sizes per node for each of the multi-generational and/or multi-SKU nodes in the training cluster such that jobs can be scheduled across multiple generation nodes operating as one training cluster. Such a distributed training at "scale" approach opens a new opportunity for training that is traditionally done only in homogenous hardware. Infrastructure managers, CSPs and data centers may create large and fungible cluster allocations for artificial intelligence (AI) applications using all of the varied resources. Moreover, infrastructure resource utilization may be improved while achieving better performance and efficiency in data centers, CSPs, etc. (e.g., by including any and all compute resources available). In addition, increased revenues (or higher return on investments) can be obtained while keeping the same TCO within the data center and CSPs.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller;
a processor coupled to the network controller; and
a memory coupled to the processor, the memory including a set of executable program instructions, which when executed by the processor, cause the computing system to:
identify a first set of compute nodes and a second set of compute nodes, wherein the first set of compute nodes execute more slowly than the second set of compute nodes;
enumerate possible configuration combinations for the first set of compute nodes and the second set of compute nodes, wherein the possible configuration combinations include a first possible configuration combination and a second possible configuration combination;
measure a throughput and a completion time associated with each of the possible configuration combinations;
identify a difference in completion times for the first set of compute nodes and the second set of compute nodes for each of the possible configuration combinations, wherein the difference in the completion time of the first possible configuration combination is to be higher than the difference in the completion time of the second possible configuration combination;
conduct an identification that the first possible configuration combination has a relatively high throughput;

determine that a compute node configuration is to be the first possible configuration combination based on the differences in completion times and the identification, wherein the compute node configuration results in a relatively low difference in completion time between the first set of compute nodes and the second set of compute nodes with respect to a neural network workload; and apply the compute node configuration to an execution of the neural network workload on one or more nodes in the first set of compute nodes and one or more nodes in the second set of compute nodes.

2. The system of claim 1, wherein the compute node configuration is to specify a local number of processes on the first set of compute nodes, a local batch size for the first set of compute nodes, a local number of processes on the second set of compute nodes, and a local batch size for the second set of compute nodes.

3. The system of claim 1, wherein the neural network workload is to be a training workload, and the relatively low difference in completion time reduces a synchronization time between the first set of compute nodes and the second set of compute nodes.

4. The system of claim 1, wherein the neural network workload is to be an inference workload.

5. A semiconductor package comprising:
one or more substrates; and
logic coupled to the one or more substrates, wherein the logic is implemented at least partly in one or more of configurable logic or fixed-functionality hardware logic, the logic coupled to the one or more substrates to:
identify a first set of compute nodes and a second set of compute nodes, wherein the first set of compute nodes execute more slowly than the second set of compute nodes,
enumerate possible configuration combinations for the first set of compute nodes and the second set of compute nodes, wherein the possible configuration combinations include a first possible configuration combination and a second possible configuration combination;
measure a throughput and a completion time associated with each of the possible configuration combinations;
identify a difference in completion times for the first set of compute nodes and the second set of compute nodes for each of the possible configuration combinations, wherein the difference in the completion time of the first possible configuration combination is to be higher than the difference in the completion time of the second possible configuration combination;
conduct an identification that the first possible configuration combination has a relatively high throughput;
determine that a compute node configuration is to be the first possible configuration combination based on the differences in completion times and the identification, wherein the compute node configuration results in a relatively low difference in completion time between the first set of compute nodes and the second set of compute nodes with respect to a neural network workload, and
apply the compute node configuration to an execution of a neural network workload on one or more nodes in the first set of compute nodes and one or more nodes in the second set of compute nodes.

6. The semiconductor package of claim 5, wherein the compute node configuration is to specify a local number of processes on the first set of compute nodes, a local batch size for the first set of compute nodes, a local number of processes on the second set of compute nodes, and a local batch size for the second set of compute nodes.

7. The semiconductor package of claim 5, wherein the neural network workload is to be a training workload, and the relatively low difference in completion time reduces a synchronization time between the first set of compute nodes and the second set of compute nodes.

8. The semiconductor package of claim 5, wherein the neural network workload is to be an inference workload.

9. The semiconductor package of claim 5, wherein the logic coupled to the one or more substrates includes transistor channel regions that are positioned within the one or more substrates.

10. At least one non-transitory computer readable storage medium comprising a set of executable program instructions, which when executed by a computing system, cause the computing system to:
identify a first set of compute nodes and a second set of compute nodes, wherein the first set of compute nodes execute more slowly than the second set of compute nodes;
enumerate possible configuration combinations for the first set of compute nodes and the second set of compute nodes, wherein the possible configuration combinations include a first possible configuration combination and a second possible configuration combination;
measure a throughput and a completion time associated with each of the possible configuration combinations;
identify a difference in completion times for the first set of compute nodes and the second set of compute nodes for each of the possible configuration combinations, wherein the difference in the completion time of the first possible configuration combination is to be higher than the difference in the completion time of the second possible configuration combination;
conduct an identification that the first possible configuration combination has a relatively high throughput;
determine that a compute node configuration is to be the first possible configuration combination based on the differences in completion times and the identification, wherein the compute node configuration results in a relatively low difference in completion time between the first set of compute nodes and the second set of compute nodes with respect to a neural network workload; and
apply the compute node configuration to an execution of the neural network workload on one or more nodes in the first set of compute nodes and one or more nodes in the second set of compute nodes.

11. The at least one non-transitory computer readable storage medium of claim 10, wherein the compute node configuration is to specify a local number of processes on the first set of compute nodes, a local batch size for the first set of compute nodes, a local number of processes on the second set of compute nodes, and a local batch size for the second set of compute nodes.

12. The at least one non-transitory computer readable storage medium of claim 10, wherein the neural network workload is to be a training workload, and the relatively low difference in completion time reduces a synchronization time between the first set of compute nodes and the second set of compute nodes.

13. The at least one non-transitory computer readable storage medium of claim 10, wherein the neural network workload is to be an inference workload.

14. A method comprising:
identifying a first set of compute nodes and a second set of compute nodes, wherein the first set of compute nodes execute more slowly than the second set of compute nodes;
enumerating possible configuration combinations for the first set of compute nodes and the second set of compute nodes, wherein the possible configuration combinations include a first possible configuration combination and a second possible configuration combination;
measuring a throughput and a completion time associated with each of the possible configuration combinations;
identifying a difference in completion times for the first set of compute nodes and the second set of compute nodes for each of the possible configuration combinations, wherein the difference in the completion time of the first possible configuration combination is higher than the difference in the completion time of the second possible configuration combination;
conducting an identification that the first possible configuration combination has a relatively high throughput;
determining that a compute node configuration is the first possible configuration combination based on the differences in completion times and the identification, wherein the compute node configuration results in a relatively low difference in completion time between the first set of compute nodes and the second set of compute nodes with respect to a neural network workload; and
applying the compute node configuration to an execution of the neural network workload on one or more nodes in the first set of compute nodes and one or more nodes in the second set of compute nodes.

15. The method of claim 14, wherein the compute node configuration specifies a local number of processes on the first set of compute nodes, a local batch size for the first set of compute nodes, a local number of processes on the second set of compute nodes, and a local batch size for the second set of compute nodes.

16. The method of claim 14, wherein the neural network workload is a training workload, and the relatively low difference in completion time reduces a synchronization time between the first set of compute nodes and the second set of compute nodes.

17. The method of claim 14, wherein the neural network workload is an inference workload.

* * * * *